(12) United States Patent
Johnson

(10) Patent No.: US 6,515,623 B2
(45) Date of Patent: Feb. 4, 2003

(54) ENHANCED LOCATION METHODOLOGY FOR A LOCATION SYSTEM

(75) Inventor: Mark J. Johnson, Cary, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/897,007

(22) Filed: Jun. 29, 2001

(65) Prior Publication Data

US 2003/0001777 A1 Jan. 2, 2003

(51) Int. Cl.[7] ................................................. G01S 1/24
(52) U.S. Cl. .......................................... 342/387; 342/457
(58) Field of Search ................................. 342/387, 457, 342/450, 453, 463; 455/455, 456

(56) References Cited

U.S. PATENT DOCUMENTS 6,137,077 A1 * 11/2001 Soleimani et al. ..... 342/357.05
6,404,388 B1 * 6/2002 Sollenberger et al. ...... 342/387
6,459,903 B1 * 10/2002 Lee ............................. 455/456

* cited by examiner

Primary Examiner—Dao Phan
(74) Attorney, Agent, or Firm—Terri S. Hughes; Valerie M. Davis

(57) ABSTRACT

A first device (100) transmits a first signal to a second device (300) at a first time. A third device (110) detects a second signal from the second device (300) at a second time. The second signal was transmitted in response to detection of the first signal. Based on the first and second times, a sum of a first propagation delay (200) and a second propagation delay (210) is estimated. The first propagation delay (200) is between the first device (100) and the second device (300), and the second propagation delay (210) is between the second device (300) and the third device (110). The sum of the first and second propagation delays (200, 210) is then used to estimate a location of the second device (300).

20 Claims, 6 Drawing Sheets

ENHANCED LOCATION METHODOLOGY FOR A LOCATION SYSTEM

FIELD OF THE INVENTION

The present invention relates generally to an enhanced location methodology for a location system, and is especially applicable to a timing-based location system.

BACKGROUND OF THE INVENTION

Many modern location systems, such as Loran and the Global Positioning System, (GPS), are timing based. Measurements of the propagation delay of a signal between the target device (for which the location is to be determined) and one or more network devices (for which the locations are known) are used to obtain distance information, assuming that the time a signal takes to propagate is proportional to the distance the signal travels. Ranging systems estimate the distance between the target device and a network device, and time difference of arrival (TDOA) systems estimate the differences in the distances between the target device and a plurality of network devices based on the differences in the arrival times of signals traveling between the target device and the network devices. In both cases, these distance estimates are used to estimate the location of the target device.

The simplest form of such a system is ranging. In a ranging system, a synchronization signal is sent from a network device to a target device, and the target device, in response, sends a timing signal that is detected by the network device. The network device is generally in a known location. The total propagation delay, multiplied by the propagation speed of the signal, gives the total distance traveled by the synchronization signal and the timing signal, which is equal to twice the distance between the target device and the network device (range data). This sequence may be reversed, with the target device sending the synchronization signal and the network device sending the timing signal, if the delay measurement is to take place on the target device.

The distance between the target device and the network device, in two dimensions, defines a circular locus of points on which the device is located. This distance is generally combined with other information, such as the angle of arrival of the timing signal, to determine a location of the target device relative to the network device. In some implementations, multiple network devices are used to determine multiple distances between the target device and multiple known locations of network devices. However, using multiple ranging devices has the disadvantage of requiring the sending of a synchronization signal and a timing signal for each network device for which this ranging information is to be measured. The channel loading requirements are then the product of the number of target devices supported and the number of network devices involved with each target device. This second-order loading requirement often limits the number of location measurements that may be made in a given time frame.

In TDOA systems, such as Loran and GPS, a target device may send an unsynchronized signal that is detected by several network devices that are synchronized with each other, or a target device may receive signals from several network devices that are synchronized with each other but not synchronized with the target device. Although this does not directly give range data, it does give information about the differences in the distances between the target device and the various network devices (pseudo-range data). For any two network devices, the difference in the two propagation delays represents the difference in the distances from the target device to each of the network devices. As is well known in the art of location systems, this difference between the distances from the target device to each of two network devices establishes the set of possible locations as (in two dimensions) a hyperbolic locus. If three or more properly placed network devices (i.e., three devices not on the same line) are used in the measurement, it is usually possible to arrive at a unique two-dimensional solution (although certain cases may require a fourth properly placed network device). Most TDOA techniques involve heuristic or iterative solutions, since it is difficult to solve for the intersection of multiple arbitrary hyperbolae in a plane. Extension to three dimensions, requiring finding the intersection of multiple arbitrary hyperboloids, will only exacerbate this difficulty.

Both of these techniques described above suffer from an effect known in the art of location systems as geometric dilution of precision, or GDOP. A primary cause of this phenomenon is the failure of the circular or hyperbolic solution loci to intersect at right angles. Any timing error in the arrival time measurements or synchronizations will be multiplied by the cosecant of the angle of intersection of the two loci. The value of the cosecant is one (1) in the rare case where the angle of intersection is 90 degrees, and is greater at other angles, approaching infinity when the angle of intersection approaches zero or 180 degrees. For this reason, the three dimensional performance of GPS is limited on the vertical (height) axis because visible satellites are restricted to one side of the target device on the vertical axis, resulting in poor GDOP. The horizontal accuracy of the three dimensional performance of GPS is limited in occluded situations where part of the sky is not visible to the target device for the same reason. Further, most terrestrial based TDOA systems, in which the network devices are located substantially in a plane, are substantially incapable of offering any accurate vertical location information without supplementing the timing information with less reliable data, such as angle of arrival. Often, ranging is not an option in these systems due to the potential channel loading considerations.

Thus, there exists a need for a technique which can offer improved range estimates without imposing a second-order channel loading requirement, which can provide a simple closed-form location solution instead of a complex or iterative algorithm, which can offer vertical location solutions using network devices arranged on a horizontal plane, and which can offer solution loci which intersect at angles as close as possible to 90 degrees.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

In the interest of simplicity, the descriptions of location systems and techniques described herein use two-dimensional geometries except where specifically noted. It will be apparent to those skilled in the art of location systems that any of these systems and techniques may be directly extended to three dimensions or more. Although a typical system will require three or more network devices to arrive at a unique solution, the implementation and advantages of the present invention are most easily understood by focusing on a single pair of network devices and their interaction with a single target device. It will be understood by those skilled in the art of location systems that additional network devices will further improve the location estimates offered by any pair of network devices.

Figure 1:
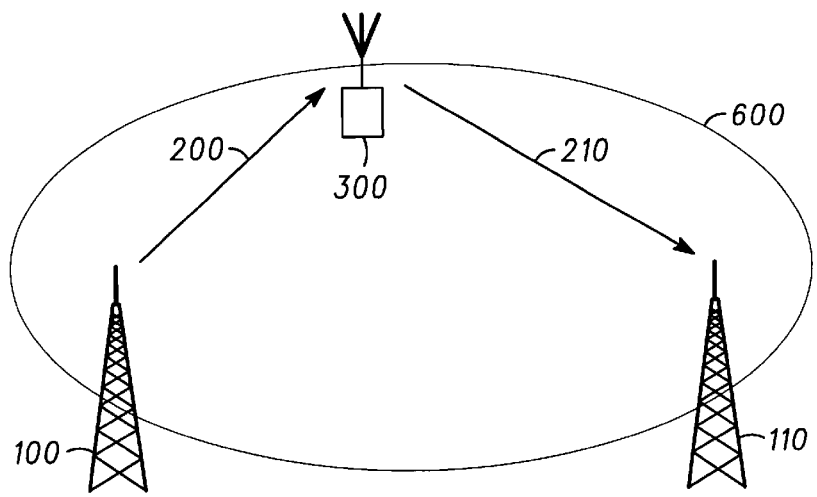
FIG. 1 illustrates the geometric basis of a network-based implementation of the present invention as implemented by two network devices belonging to a location system.

Referring to FIG. 1, a typical network topology is illustrated having a first network device 100, a second network device 110, and a target device 300. It is assumed that the network devices 100 and 110 are synchronized with each other or with a reference device (not shown). In accordance with the present invention, a synchronization signal is transmitted from the first network device 100 and, after propagating along a first distance 200, received by the target device 300. In response to this synchronization signal, the target device 300 sends a timing signal that, after propagating along a second distance 210 may be received by the second network device 110. The second network device 110 estimates a time that the timing signal from the target device 300 arrives at the second network device 110.

Figure 2:
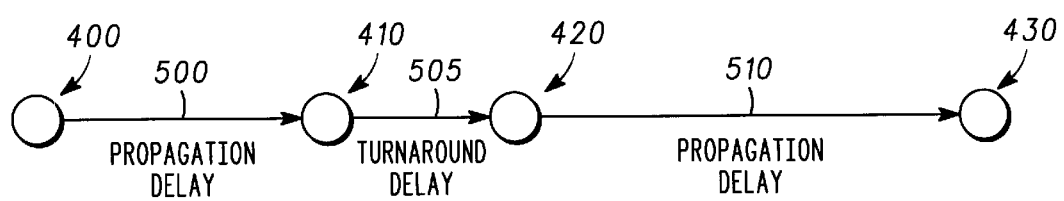
FIG. 2 illustrates the details of the timing of the signals transmitted and detected by the devices of FIG. 1 in accordance with the present invention.

The timing of this transaction is graphically illustrated in FIG. 2. At a given time 400, the synchronization signal is transmitted from the first network device 100. It is assumed that the value of the time 400 is known to the first network device 100, and may be reported to the second network device 110 or to a reference device. After a propagation delay 500 resulting from the finite propagation speed of the synchronization signal along the first distance 200, the target device 300 detects the synchronization signal at a time 410. After a turnaround delay 505, which may be any value (including zero), the target device 300 sends a timing signal in response to the synchronization signal at time 420. It is assumed that the turnaround delay 505 is known to the second network device 110 or to a reference device, either because it has been established a priori or because the target device 300 reports the turnaround delay 505 to the second network device 110 or to a reference device in some manner. Minimizing the turnaround delay 505 will also minimize the effect of any clock error between the target device 300 and the network devices 100, 110 on the overall result.

After a propagation delay 510 resulting from the finite propagation speed of the timing signal along the second distance 210, the second network device 110 at a time 430 detects the timing signal. The second network device 110 may subtract the time 400 that the synchronization signal was transmitted by the first network device 100 from the time 430 that the timing signal transmitted responsively by the target device 300 was detected by the second network device 110 to establish the total delay between the transmitting of the synchronization signal and the detection of the timing signal. The second network device 110 may further subtract the known turnaround delay 505 from that difference to determine the sum of the propagation delays 500 and 510. Multiplying this result by the propagation speed of the signals (assuming that both signals propagate at substantially the same speed) will give the sum of the distances 200, 210. These calculations described as being performed by the network device 110 may also be performed by the network device 100 or by any combination of the network devices 100, 110, and other devices, as long as the devices know the value of the turnaround delay 505, the time 400, and the time 430.

Since it is assumed that the locations of the network devices 100, 110 are known, the sum of the distances 200, 210 defines an elliptical locus of points 600 on which the target device 300 may be located. This ellipse has foci at the locations of network devices 100, 110. It is possible to estimate a location for the target device 300 in a system with more than two network devices by finding the point of intersection of several ellipses. However, this is not the most advantageous use of the present invention.

Figure 3:
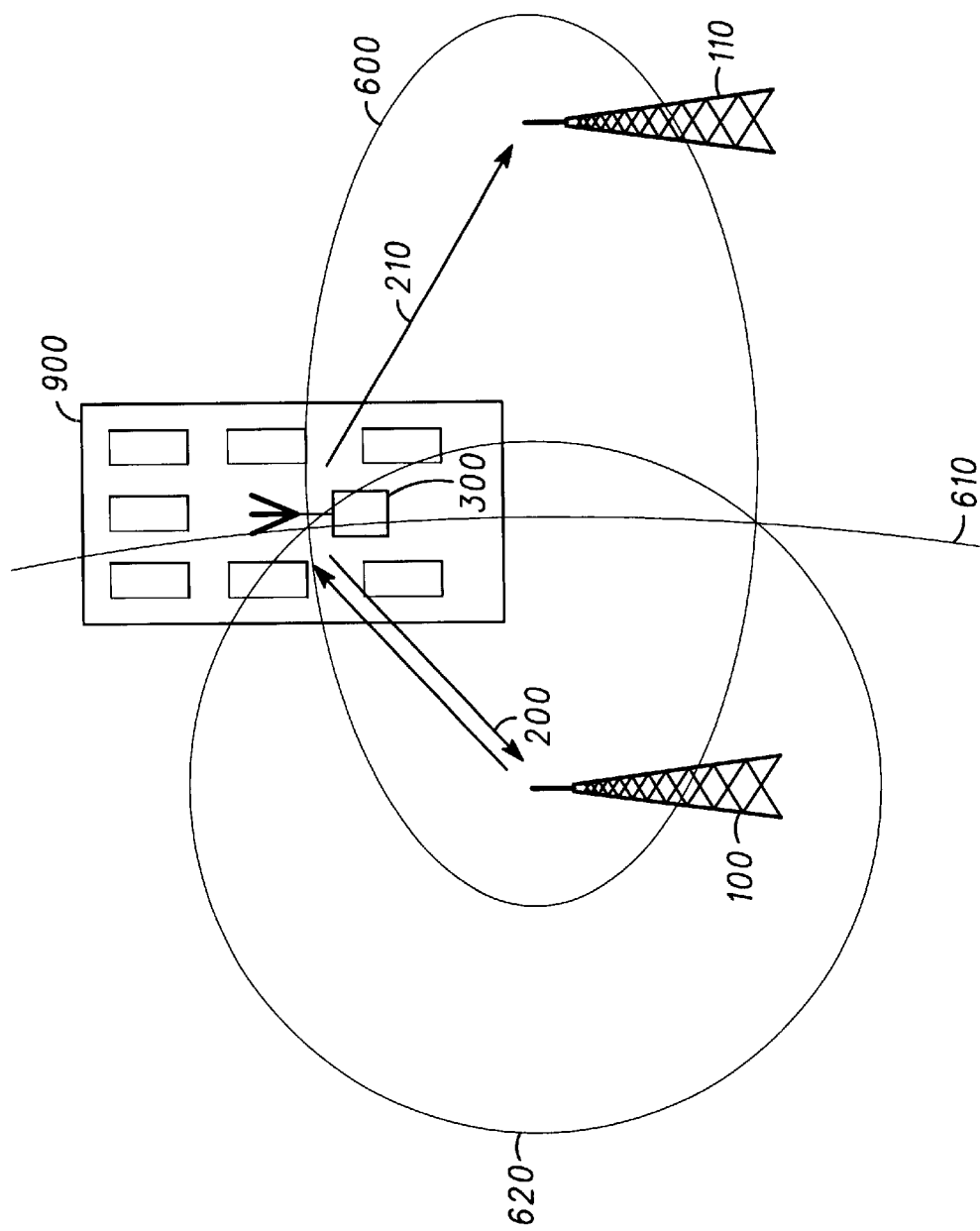
FIG. 3 illustrates the synergistic combination of the present invention with an example of the prior art.

Referring now to FIG. 3, preferably both network devices 100, 110 detect the timing signal transmitted by the target device 300. The sum of the distances 200, 210 may then be detected as described above. Because both network devices 100, 110 detect the timing signal, the difference between the distances 200, 210 may be determined as is known in the prior art, defining a hyperbolic locus 610 on which the target device 300 may be located. The location of the target device 300 may then be determined to be one of the two points at which the ellipse 600 and the hyperbola 610 intersect.

This hyperbolic/elliptic combination has several advantages. With no overhead except for the sending of a single synchronization signal, which in most cases will actually improve system capacity over asynchronous operation, the locus of solutions for a pair of network devices is reduced from a curve to a pair of points. The locations of those points can be calculated in a simple, closed-form manner, instead of the iterative, computationally intensive methods generally involved in strictly hyperbolic (TDOA) systems. The distances 200, 210 and others may be readily established without requiring synchronization signals and associated responses from multiple network devices, as would be necessary in a traditional multipoint ranging system.

Further, it can be demonstrated that the intersection of a hyperbola and a parabola constructed from the same two foci will inevitably be orthogonal (intersecting at precisely 90 degrees) at their point of intersection. The property of guaranteed orthogonality mitigates the part of the GDOP effect resulting from the angle of intersection of the solution loci. Even more significantly, if the network devices 100, 110 are assumed to be located in a horizontal plane (with the vertical dimension indicated by the building 900 depicted in the background of FIG. 3), it can be readily seen that the definition of the elliptical locus 600 provides a vertical result impossible with a strictly hyperbolic system, and exhibiting a much more desirable angle of intersection with the hyperbolic locus 610 than the corresponding circle 620 which would be offered by a traditional ranging system combined with a traditional TDOA system.

While the combination of the present invention with a TDOA system offers a number of unique advantages, it will be apparent to those skilled in the art of location systems that combining the elliptical solution locus of the present invention with the spherical solution locus of a ranging or a received signal strength information ("RSSI") system, or with the linear solution locus of an angle if arrival ("AOA") system, or with any other location systems, will result in improvements over the current art.

Figure 4:
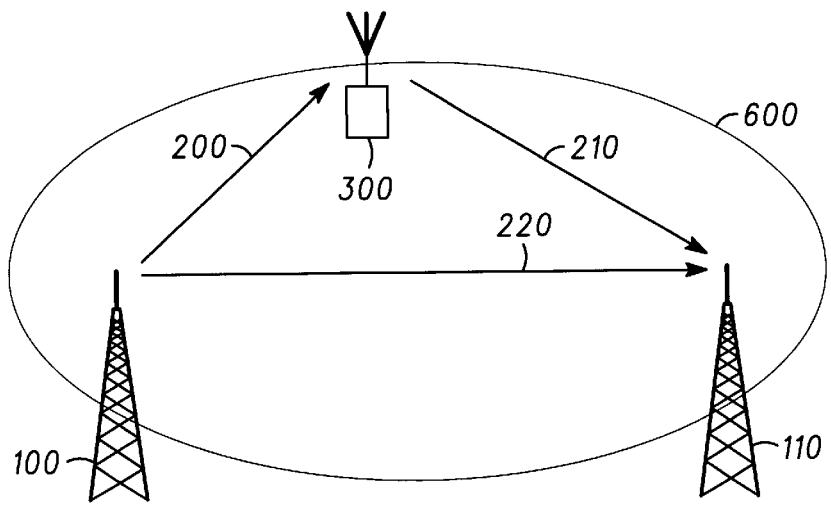
FIG. 4 illustrates an implementation of the present invention wherein external synchronization between the two network devices of FIG. 1 is unnecessary.

Referring now to FIG. 4, it is shown that inherent synchronization between network devices 100, 110 is not strictly necessary for implementation of the present invention. If the second network device 110 is capable of detecting the synchronization signal sent by the first network device 100, the second network device 110 will detect the synchronization signal sent by the first device 100 after it propagates along a third distance 220 from the first network device 100 to the second network device 110. Using the time that the second network device 110 detects the synchronization signal from the first network device 100, and the knowledge of the distance 220 between the first network device 100 and the second network device 110, the timing of the synchronization signal may be determined without a priori knowledge of the time 400 at which the synchronization signal was transmitted by the first network device 100 as described below.

Figure 5:
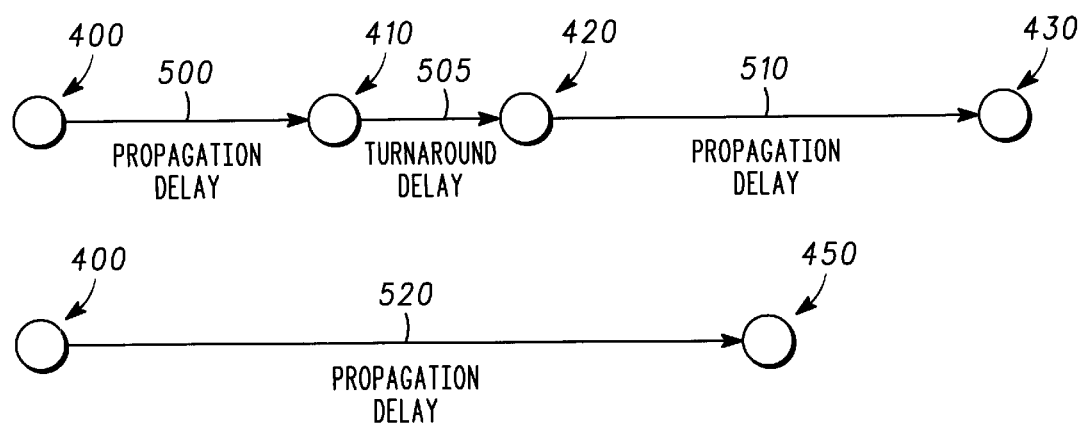
FIG. 5 illustrates the timing details of the signals transmitted and detected by the devices of FIG. 4 in accordance with the preset invention.

Referring to FIG. 5, the timing of this implementation is similar to that described above with respect to FIG. 2 except that the second network device 110 further detects the synchronization signal at time 450, after a propagation delay 520 determined by the distance 220 between the first network device 100 and the second network device 110. Since the network devices 100, 110 are at known locations, the distance 220 may be readily calculated and the propagation delay 520 easily known. Armed with the knowledge of the propagation delay 520 and arrival time 450 of the synchronization signal transmitted by the first network device 100 at the second network device 110, the time of transmission 400 of the synchronization signal by the first network device 100 may be determined by subtracting the known propagation delay 520 from the arrival time 450 of the synchronization signal from the first network device 100 at the second network device 110, and the sum of the distances 200, 210 may be estimated as described above.

It will be apparent to those skilled in the art of mathematics that the intermediate step of determining the time of transmission 400 of the synchronization signal by the first network device is unnecessary, and that the difference between the sum of the propagation delays 500, 510 and the propagation delay 520 is sufficient to establish the elliptical solution locus 600, again assuming that the locations of the network devices 100, 110 and the propagation speed of the signals are known.

Discussions to this point have involved a network-based implementation, where the timing information and location estimates are known to the network devices 100, 110 and/or to other devices in communication with them. The present invention, however, is also applicable to a subscriber-based system, where the target device 300 determines the timing information and estimates its own location. Such a system is depicted in FIG. 6, showing a protocol by which the target device 300 could establish similar information.

Figure 6:
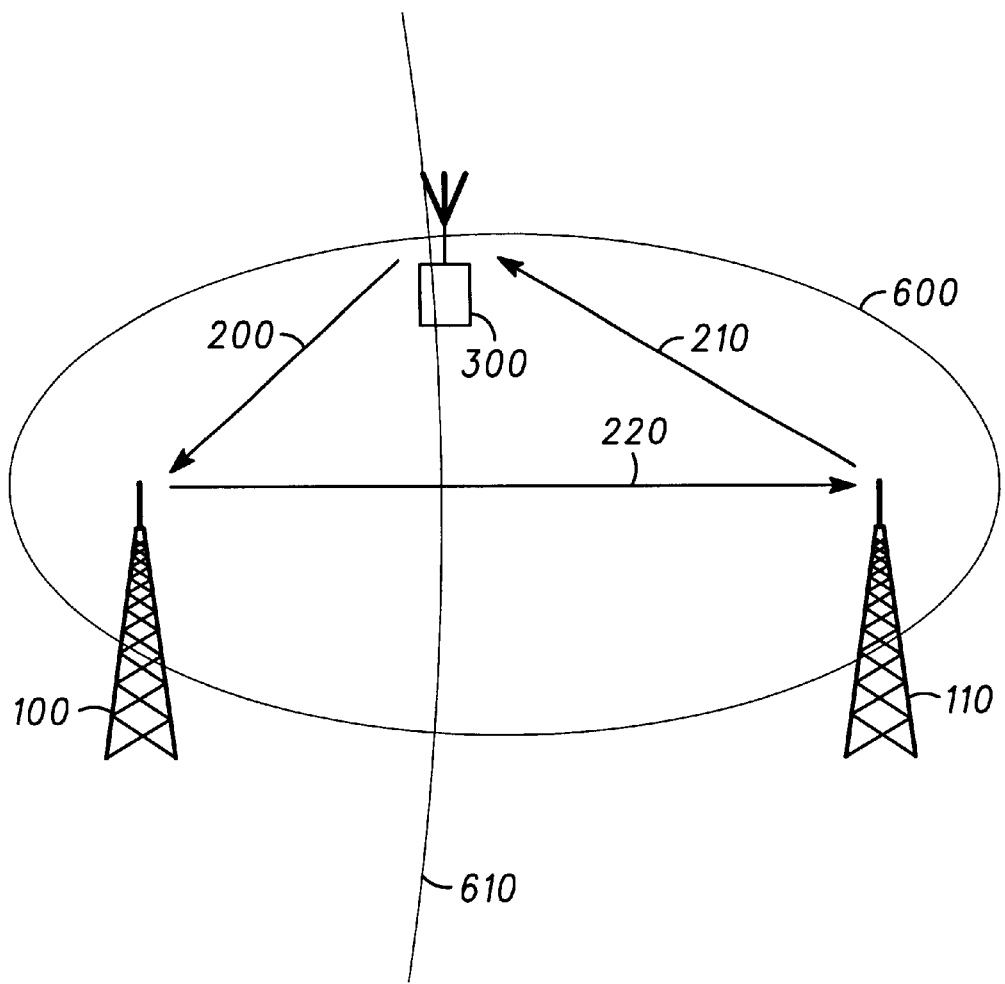
FIG. 6 illustrates the geometric basis of a subscriber-based implementation of the present invention as implemented by a subscriber device in conjunction with two network devices belonging to a location system.

Referring to FIG. 6, the target device 300 may send a first synchronization signal that, after propagating along a first distance 200, is detected by the first network device 100. The first network device 100 may then responsively send a second synchronization signal that, after propagating along a second distance 220, is detected by the second network device 110. The second network device 110 may responsively send a timing signal that, after propagating along a third distance 210, is detected by the target device 300. The target device 300 may then establish the elliptical locus 600 as described below.

Figure 7:
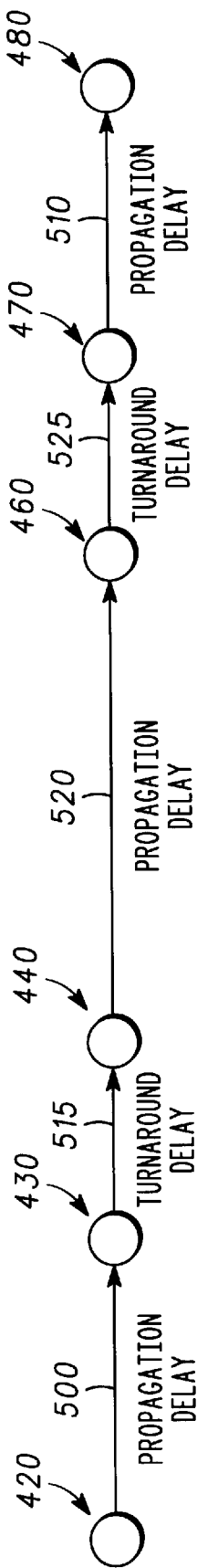
FIG. 7 illustrates the timing details of the signals transmitted and detected by the devices of FIG. 6 in accordance with the present invention.

Referring now to FIG. 7, the target device 300 sends the first synchronization signal at time 420. After a propagation delay 500 proportional to the distance 200 between the target device 300 and the first network device 100, the first network device 100 detects the first synchronization signal at a time 430. After a turnaround delay 515, the first network device 100 sends the second synchronization signal at a time 440. The second network device 110 detects the second synchronization signal at a time 460 after a propagation delay 520 proportional to the distance 220 between the first network device 100 and the second network device 110. After a second turnaround delay 525, the second network device 110 sends a timing signal at time 470. After a propagation delay 510 proportional to the distance 210 between the second network device 110 and the target device 300, the target device 300 detects the timing signal at time 480.

The target device 300 may be assumed to be privy to the time 420 at which it sent the first synchronization signal. The turnaround delays 515 and 525 may also be assumed to be known to the target device 300, either because they are established a priori at both the target device 300 and the network devices 100, 110 or because they are transmitted to the target device 300. The propagation delay 520 is known because it is the product of the distance 220 between the network devices 100, 110 and the propagation speed of the signal, and because, since the locations of the network devices 100, 110 are known, the distance 220 between them is readily calculated. Subtracting the transmission time 420 of the first synchronization signal from the detection time 480 of the timing signal, and further subtracting the known turnaround delays 515, 525 and the propagation delay 520 from that result, the sum of the propagation delays 510, 500 is derived. Multiplication by the propagation speed of the signal gives the sum of the distances 210, 200. From that and knowledge of the location of the network devices 100, 110, the ellipse 600 may be defined as described above. It will be clear to those skilled in the art of location systems that if the target device 300 further detects the first synchronization signal sent by the network device 110, a hyperbolic locus 610 may be constructed as in existing systems, such as GPS and Loran, which will complement the elliptical locus of the present invention. It will also be clear to those skilled in the art of location systems that, although the preferred embodiment describes synchronization of the network devices 100, 110 by propagation of a synchronization signal between them, any implementation of synchronization between the network devices 100, 110 that maintains a delay knowable to the target device 300 between the time of detection 430 of the first synchronization signal by the network device 100 and the time of transmission 470 of the timing signal by the second network device 110 will offer similar results.

Figure 8:
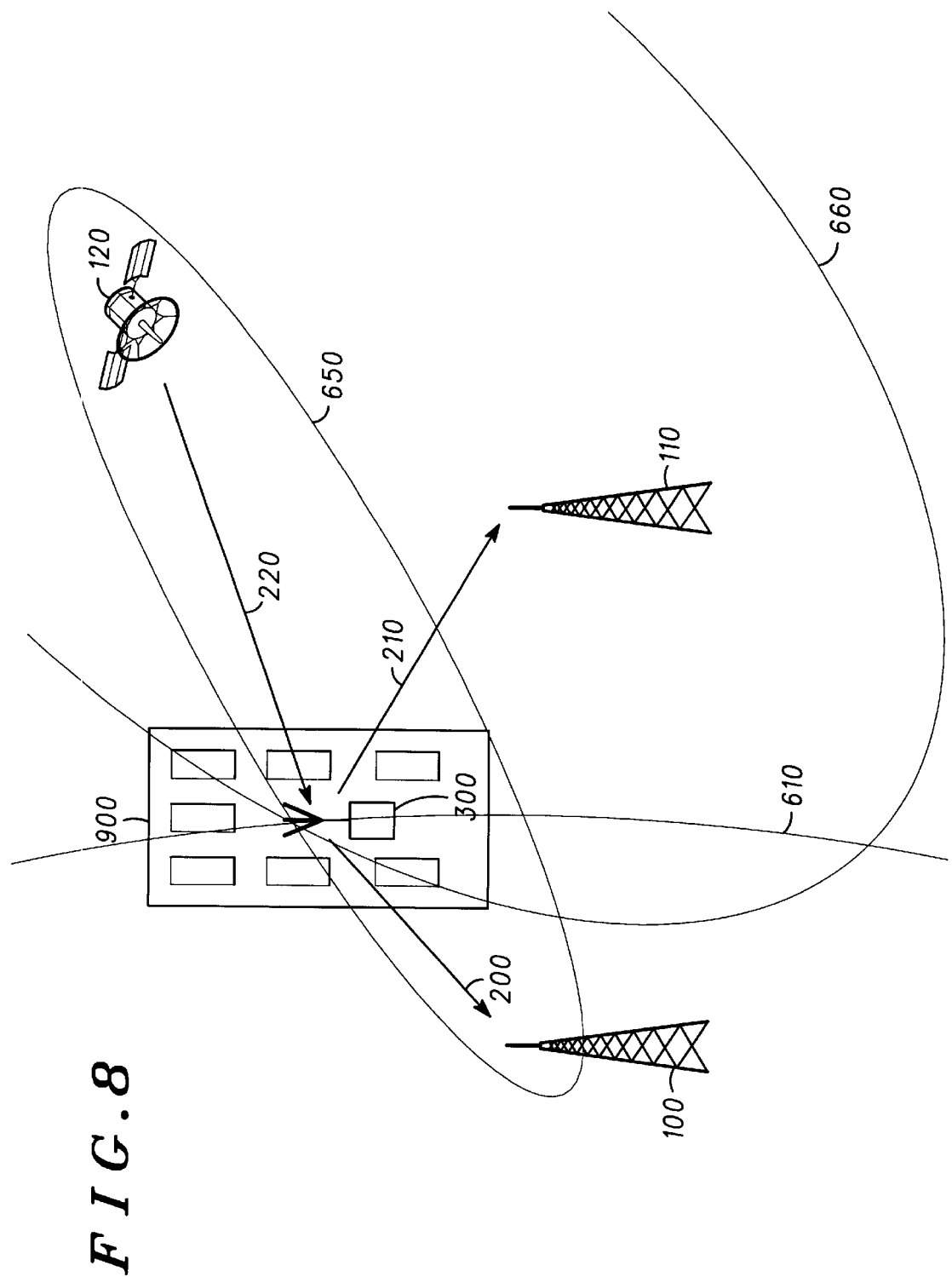
FIG. 8 illustrates an implementation of the present invention wherein the present invention enables a synergistic combination of two otherwise disparate location systems, providing improved performance over either system alone.

Referring now to FIG. 8, it may be seen that the present invention offers the possibility of hybridization between disparate systems. Shown is a subscriber device 300 capable of transmitting to network devices 100, 110 and receiving from a network device 130, depicted as a GPS satellite. In this arrangement, the differences in the arrival times of the timing signal at network devices 100, 110 establishes a hyperbolic locus 610 as in the prior art. However, the timing signal is transmitted responsively to a synchronization signal from the network device 130 as described in the present invention. It is assumed that the network devices 100, 110 know the timing of the synchronization signal, for instance in the manner described in the discussion of FIG. 4 and FIG. 5. Thus, the present invention defines a first elliptical locus 650 from the sum of the distance 230 from the network device 130 to the target device 300 and the distance 200 from the target device 300 to the network device 100, as well as a second elliptical locus 660 from the sum of the distance 230 from the network device 130 to the target device 300 and the distance 210 from the target device 300 to the network device 110. It is clear that this information results in improved vertical accuracy compared to that which would be provided by either system working alone.

While the invention has been described in conjunction with specific embodiments thereof, additional advantages and modifications will readily occur to those skilled in the art of location systems. The invention, in its broader aspects, is therefore not limited to the specific details, representative apparatus, and illustrative examples shown and described. Various alterations, modifications and variations will be apparent to those skilled in the art of location systems in light of the foregoing description. These may include, but are certainly not limited to, application of the present invention to other implementations of location systems, as well as combination of the present invention with other location techniques such as AOA, RSSI, and ranging. Thus, it should be understood that the invention is not limited by the foregoing description, but embraces all such alterations, modifications and variations in accordance with the spirit and scope of the appended claims.

I claim:

1. A location method used in a location system, the method comprising the steps of:
    at a first device, transmitting a first signal to a second device at a first time;
    at a third device, detecting a second signal from the second device at a second time, wherein the second signal was transmitted in response to detection of the first signal;
    based on the first and second times, estimating a sum of a first propagation delay and a second propagation delay, wherein the first propagation delay is between the first device and the second device, and the second propagation delay is between the second device and the third device; and
    using the sum of the first and second propagation delays to estimate a location of the second device.

2. The method of claim 1 further comprising the step of using the sum of the first and second propagation delays to define a first locus of points on which the second device is located.

3. The method of claim 2 further comprising the steps of:
    defining a second locus of points on which the second device is located; and
    estimating a location of the second device based on an intersection of the first locus of points and the second locus of points.

4. The method of claim 3 wherein the step of defining a second locus of points comprises one of the following steps:
    estimating a difference between the first and second propagation delays;
    estimating at least one of the first and the second propagation delays; and
    estimating a direction from which the second signal originated.

5. The method of claim 1 wherein the step of estimating a sum is further based on a delay time, wherein the delay time is a time between detection of the first signal at the second device and transmission of the second signal by the second device.

6. The method of claim 5 further comprising the step of establishing the delay time a priori at at least one of the following devices: the first device, the second device, the third device, and a fourth device.

7. The method of claim 5 further comprising the step of reporting the delay time to at least one of the following devices: the first device, the second device, the third device, and a fourth device.

8. The method of claim 1 wherein the first device and the third device are not a part of a common system.

9. The method of claim 1 further comprising the step of synchronizing the first device and the third device with each other.

10. The method of claim 1 further comprising the step of synchronizing the first device and the third device with a reference source.

11. A location method used in a location system comprising the steps of:
    at a first device, detecting a first signal from a second device, and responsive to detection of the first signal, transmitting a second signal to a third device;
    estimating a first time when the first signal was transmitted from the second device;
    estimating a second time when the second signal was received at the third device;
    based on the first time and the second time, estimating a sum of a first propagation delay and a second propagation delay, wherein the first propagation delay is between the first device and the second device, and the second propagation delay is between the first device and the third device; and
    using the sum of the first and second propagation delays to estimate a location of the first device.

12. The method of claim 11 further comprising the step of detecting the second signal at the second device.

13. The method of claim 11 further comprising the step of detecting the first signal at the third device.

14. A location method used in a location system, the method comprising the steps of:
    at a first device, detecting a first signal from a second device at a first time;
    at the first device, detecting a second signal from a third device at a second time, wherein the second signal was transmitted from the third device in response to detecting the first signal from the second device at the third device;
    based on the first time and the second time, estimating a difference between a first propagation delay and a sum of a second propagation delay and a third propagation delay, wherein the first propagation delay is between the first device and the second device, the second propagation delay is between the second device and the third device, and the third propagation delay is between the first device and the third device; and
    using the difference between the first propagation delay and the sum of the second and third propagation delays to estimate a location of the second device.

15. The method of claim 14 further comprising the step of defining a first locus of points based on a difference between the first propagation delay and a sum of the second and third propagation delays.

16. The method of claim 14 wherein the first device and the second device are not a part of a common system.

17. A location method used in a location system, the method comprising the steps of:
- at a first device, transmitting a first signal at a first time, and detecting a second signal at a second time, wherein the second signal was transmitted from a second device in response to detecting the first signal from the first device at a third device;
- based on the first time and the second time, estimating a sum of a first propagation delay and a second propagation delay, wherein the first propagation delay is between the first device and the second device and the second propagation delay is between the first device and the third device; and
- using the sum of the first and second propagation delays to estimate a location of the first device.

18. The method of claim 17 further comprising the step of using the sum of the first and second propagation delays to define a first locus of points on which the first device is located.

19. The method of claim 18 further comprising the steps of:
- defining a second locus of points on which the first device is located; and
- estimating a location of the first device based on an intersection of the first locus of points and the second locus of points.

20. The method of claim 17 wherein the step of estimating a sum is further based on a delay time, wherein the delay time is a time between detection of the first signal at the second device and transmission of the second signal by the second device.

* * * * *